United States Patent
Cottevieille et al.

(12)

(10) Patent No.: US 6,761,976 B2
(45) Date of Patent: Jul. 13, 2004

(54) TEAR-RESISTANT COMPOSITION BASED ON SILICONE RUBBER FOR CABLES AND FOR POWER ACCESSORIES

(75) Inventors: Denis Cottevieille, Montreuil sous Bois (FR); Lionel Fomperie, Auffargis (FR); Pascal Amigouet, Boissy Saint Yon (FR)

(73) Assignee: Nexans, Paris (FR)

( * ) Notice: Subject to any disclaimer, the term of this patent is extended or adjusted under 35 U.S.C. 154(b) by 0 days.

(21) Appl. No.: 10/042,350

(22) Filed: Jan. 11, 2002

(65) Prior Publication Data

US 2002/0160209 A1 Oct. 31, 2002

(30) Foreign Application Priority Data

Jan. 11, 2001 (FR) ............................................. 01 00309

(51) Int. Cl.$^7$ ............................................... C08L 83/03
(52) U.S. Cl. ....................... 428/447; 525/106; 524/506
(58) Field of Search ..................... 525/106; 524/506; 428/447; 595/105

(56) References Cited

U.S. PATENT DOCUMENTS

| | | | |
|---|---|---|---|
| 3,969,308 A | | 7/1976 | Penneck |
| 4,234,702 A | | 11/1980 | Nakamura |
| 4,341,675 A | | 7/1982 | Nakamura |
| 4,550,056 A | | 10/1985 | Pickwell et al. |
| 5,171,787 A | * | 12/1992 | Zama et al. ............... 525/105 |
| 6,362,288 B1 | * | 3/2002 | Brewer et al. ............. 525/431 |

FOREIGN PATENT DOCUMENTS

| | | |
|---|---|---|
| EP | 0402904 A2 | 12/1990 |
| EP | 0420031 A2 | 4/1991 |

* cited by examiner

Primary Examiner—Margaret G. Moore
(74) Attorney, Agent, or Firm—Sughrue Mion, PLLC

(57) ABSTRACT

The composition comprises: an organopolysiloxane; a polymer material resistant to tearing; a first coupling agent compatible with said organopolysiloxane, and having hydroxyl first functional groups; and a second coupling agent compatible with said polymer and having second functional groups suitable for reacting with said hydroxyl first groups. Application to power accessories and cables.

7 Claims, 1 Drawing Sheet

FIG_1
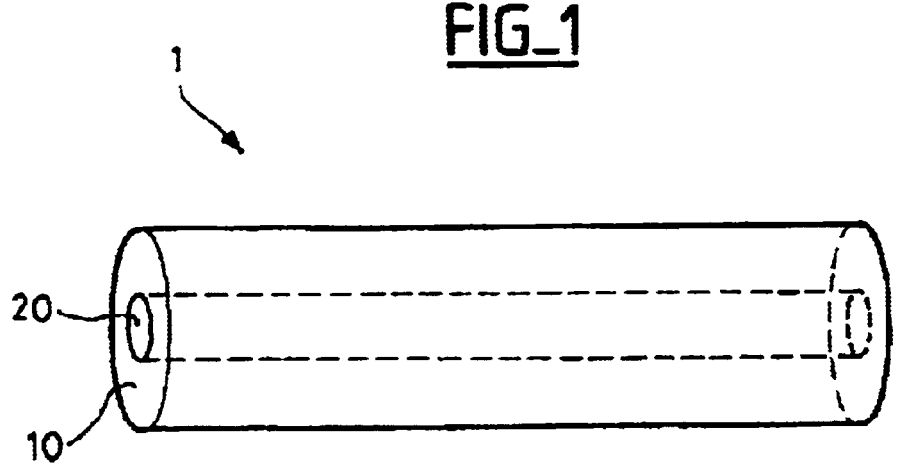
FIG_2
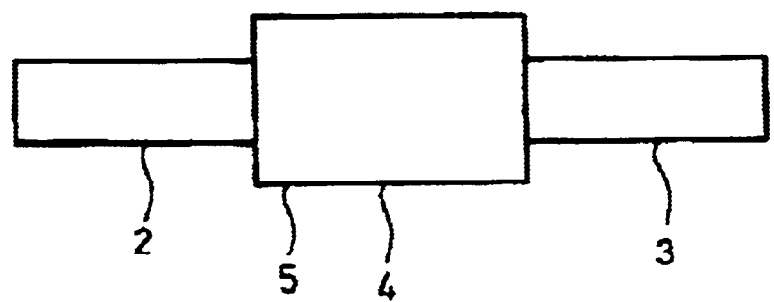

TEAR-RESISTANT COMPOSITION BASED ON SILICONE RUBBER FOR CABLES AND FOR POWER ACCESSORIES

The present invention relates to compositions based on silicone rubber that are used in the fields of telecommunications and power cables, and of power accessories.

BACKGROUND OF THE INVENTION

Such compositions are already in wide use in cable-making, and for making power cable accessories, in particular because of their excellent dielectric properties, their thermal stability at low temperatures and at high temperatures, their ability to withstand the atmospheric or ambient conditions under which they are used, and their elasticity.

In general, they are cross-linked, in particular by peroxide and/or a cross-linking catalyst. They are worked by extrusion or by molding.

Compositions based on silicone rubber often incorporate one or more fillers suitable for improving one or more specific properties in order to satisfy particular requirements of defined real or potential operating conditions.

Thus, for example, it is well known that compositions based on silicone rubber can be used for making medium-voltage, high-voltage, or very high voltage cable accessories that can expand and retract elastically, and that therefore do not need any flame to be used to install them on the cables.

In particular, Document EP-A-0 840 422 relates to an accessory of that type, and more particularly it relates to an outdoor termination for a power cable, which termination has improved ability to withstand tracking currents and atmospheric conditions. To that end, it discloses that the termination is based on silicone rubber and is made up of two layers, with formulations that are different from one layer to the other. The silicone rubber of the outer layer of that outdoor termination is filled with alumina trihydrate to impart the desired ability to withstand tracking currents and atmospheric conditions, while its elastic properties are thus reduced. The inner layer is made of silicone rubber without the above-mentioned filler, and it is secured mechanically to the outer layer so that it alone imparts the required elasticity characteristics to the termination.

In analogous manner, it is well known that silicone rubbers can be used to make insulation and/or covering and/or packing layers for power cables.

In particular, Document FRA-2 450 855 discloses such a composition containing a flame retardant filler, in particular a ceramizable filler, for obtaining high resistance to fire and to fire propagation.

It is also known that silicone elastomers or rubbers have physical characteristics that are often insufficient, in particular relatively low tear strength, and that are improved by incorporating reinforcing fillers, in particular colloidal silica.

Document U.S. Pat. No. 3,024,126 discloses such a reinforcing silica treated by associating an amine compound and an organosilicon compound carrying hydroxy or alcoxy groups and incorporated in a silicone elastomer to improve its physical properties.

Such improvement of the physical properties of silicone rubbers used in cable-making and in power accessories is even more necessary since they must also contain a non-reinforcing filler, such as one of the above-indicated fillers for obtaining resistance to fire or ability to withstand tracking currents, and/or operating conditions, which can then lead to the initial physical properties being degraded. After extrusion or molding, such degradation can lead to a surface appearance that is degraded and to internal structure that is non-uniform, possibly with micro-bubbles being present, and leads to the tear strength no longer being sufficient.

OBJECTS AND SUMMARY OF THE INVENTION

An object of the present invention is to provide a composition based on silicone rubber and that has improved tear strength.

Furthermore, adding non-reinforcing filler and/or reinforcing filler can make working difficult and lengthy in order to obtain satisfactory homogenization of all of the ingredients of the composition.

Advantageously, another object of the present invention is to avoid such difficulties in working.

The present invention provides a composition based on silicone rubber and resistant to tearing, for cables and for power accessories, said composition comprising:

- the silicone rubber on which it is based, constituted by an organopolysiloxane;
- a first coupling agent compatible with said organopolysiloxane, and having hydroxyl first functional groups;
- a polymer material resistant to tearing;
- a second coupling agent compatible with said polymer and having second functional groups suitable for reacting with said hydroxyl first groups; and
- a cross-linking agent and/or catalyst.

In this composition of the invention, the first and second coupling agents are compatible respectively with the organopolysiloxane and with said polymer material, in the sense that the organopolysiloxane and the polymer material do not degrade the initial properties respectively of the silicone rubber and of the polymer material, and that they guarantee that the composition is homogeneous after mixing.

Chemical reaction between said first and second functional groups of said first and second coupling agents gives rise to physical coupling between said organopolysiloxane and the polymer material via diffusion bonds, even though, in the natural state, they are incompatible with each other. Since this coupling does not involve any chemical reaction, it can take place at temperatures that are relatively low, so that cross-linking does not occur. In particular, mixing can be effected in machines conventionally used for molding and extrusion. The composition is then heated to the cross-linking temperature.

The silicone rubber on which the composition is based may be of the elastomer rubber or the silicone rubber (SR) type, vulcanizing at high temperature (high temperature vulcanizing (HTV)) under the action of a peroxide, or at ambient temperature (room temperature vulcanizing (RTV)) either under the action of an alcoyl silicate in the presence of an organo-stannous catalyst or by means of a cross-linking catalyst, in particular a catalyst based on a platinum salt. In a variant, it may be of the liquid silicone rubber (LSR) type or of the extra-liquid rubber (XLR) type, in general hot vulcanized by means of a cross-linking catalyst, in particular a catalyst based on a platinum salt.

Preferably, for making power cable accessories, such as outdoor or even indoor terminations, gaskets, or insulators, the silicone rubber that is chosen is an LSR of viscosity lying in the range 30 pascal-seconds (Pa.s) to 200 Pa.s, and more precisely about 100 Pa.s. For applications in cables and in particular in fire-resistant safety cables, the silicone rubber chosen is an HTV elastomer rubber of viscosity lying in the range 100 Pa.s to 10,000 Pa.s, and preferably about 6,000 Pa.s.

The polymer material of said composition is chosen from plastics materials having excellent physical and mechanical properties. It is preferably chosen from among the polymers and copolymers of ethylene, the polymers and copolymers of propylene, and various mixtures thereof.

According to an additional characteristic of the composition, said first coupling agent is a hydroxyl-containing silicone oil, and said second coupling agent is a compound in which said second functional groups are selected from: stearates; amines; alcohols; carboxylics; and carboxylates.

In particular, the hydroxyl-containing silicone oil has a hydroxyl group content that advantageously lies in the range 0.01% to 4% and that is preferably about 0.08%.

According to another additional characteristic, the composition further comprises a filler suitable for conferring a predetermined specific additional property, for given operating conditions.

These fillers comprise, in particular, flame-retardant fillers and, more particularly, ceramizable fillers, which are well known for "safety" cables, or fillers also well known per se and used for improving a desired predetermined property, e.g. predetermined ability to withstand tracking currents and ambient atmospheric conditions, for outdoor terminations and insulators in particular.

In particular, for 100 parts by weight of said organopolysiloxane, the composition of the invention contains in the range 0.5 parts by weight to 50 parts by weight of said polymer material, in the range 0.5 parts by weight to 20 parts by weight of said first coupling agent, and in the range 0.5 parts by weight to 20 parts by weight of said second coupling agent.

Naturally, said composition may also contain additives in common use, such as anti-oxidants, stabilizers, pigments, and semi-conductive fillers, in particular.

The present invention also provides a telecommunications or power cable including a covering layer and/or an insulating layer and/or a packing layer made of the above-described composition.

The present invention also provides a power accessory including a layer made of the above-described composition.

Examples of non-filled formulations of the composition of the invention are indicated below with reference to its main ingredients, together with the tear strength of the resulting samples as determined in compliance with Standard ASTM D 624 Die T, in comparison with the tear strength of samples made of the same silicone rubber base material and determined in compliance with the same standard.

BRIEF DESCRIPTION OF THE DRAWING

In the following figures:

FIG. 1 is a diagrammatic side view of a power cable which, in a preferred embodiment, includes a covering layer made of a composition of the invention; and FIG. 2 is a diagrammatic side view of a power cable splice which, in a preferred embodiment, includes an outer layer made of a composition of the invention.

MORE DETAILED DESCRIPTION

EXAMPLE 1
(By Way of Comparison)
LSR, reference 1551/100P, Dow Corning
Tear strength: 5.1 newtons per mm (N/mm)

EXAMPLE 2

| | |
|---|---|
| LSR, ref. 1551/100 P, Dow Corning | 100 parts by weight |
| PE, ref. Icorene MP 650-50, Ico Polymers | 2 parts by weight |
| Ethylene glycol | 1 part by weight |
| SiOH oil, ref. PS 343.8, Degussa Hüls | 0.3 parts by weight |
| Tear strength | 6.8 N/mm |

EXAMPLE 3
(By Way of Comparison)

| | |
|---|---|
| HTV SR, ref. Elastosil R420/70, Wacker | 100 parts by weight |
| Dicumyl peroxide | 1.1 parts by weight |
| Tear strength | 5 N/mm |

EXAMPLE 4

| | |
|---|---|
| HTV SR, ref. Elastosil R420/70, Wacker | 150 parts by weight |
| Linear Low Density Polyethylene (LLDPE), ref. Fusabond MB 226D, Dupont de Nemours | 20 parts by weight |
| SiOH oil, ref. PS 343.8, Degussa Hüls | 6 parts by weight |
| Ethylene glycol | 10 parts by weight |
| Dicumyl peroxide | 1.1 parts by weight |
| Tear strength | 17.5 N/mm |

EXAMPLE 5
Differed from Example 4 in that 10 parts by weight of magnesium stearate were used instead of the 10 parts by weight of ethylene glycol.

Tear strength: 12.6 N/mm

EXAMPLE 6
Differed from Example 4 in that 10 parts by weight of n-butyl trimethoxysilane were used instead of the 10 parts by weight of ethylene glycol.

Tear strength: 16.6 N/mm

The various ingredients of the composition were homogenized in a sequence chosen so that cross-linking did not take place, and the resulting mixture was then heated to the cross-linking temperature.

It was quick and easy to work on the machines conventionally used for molding and extrusion, regardless of whether the composition was filled.

FIG. 1 is a diagrammatic side view of a power cable 1 which, in a preferred embodiment, includes a covering layer 10 made of a composition of the invention and surrounding the core 20 of the cable 1.

FIG. 2 is a diagrammatic side view of a cable splice 4 interconnecting two power cables 2 and 3, and, in a preferred embodiment, including an outer layer 5 made of a composition of the invention.

The invention is also applicable to telecommunications cables.

What is claimed is:

1. A composition based on silicone rubber and resistant to tearing, for cables and for power accessories, said composition comprising:

the silicone rubber on which it is based, constituted by an organopolysiloxane;

a first coupling agent compatible with said organopolysiloxane, and having hydroxyl first functional groups;

a polymer material resistant to tearing and selected from the group consisting of the polymers and copolymers of ethylene, the polymers and copolymers of propylene, and mixtures thereof;

a second coupling agent compatible with said polymer and having second functional groups suitable for reacting with said hydroxyl first groups; and a cross-linking agent and/or catalyst.

2. A composition according to claim 1, wherein said first coupling agent is a hydroxyl-containing silicone oil, and said second coupling agent is a compound in which said second functional groups are selected from: stearates; amines; alcohols; carboxylics; and carboxylates.

3. A composition according to claim 1, wherein, for 100 parts by weight of said organopolysiloxane, it contains in the range 0.5 parts by weight to 50 parts by weight of said polymer material, in the range 0.5 parts by weight to 20 parts by weight of said first coupling agent, and in the range 0.5 parts by weight to 20 parts by weight of said second coupling agent.

4. A composition according to claim 1, further comprising a filler suitable for conferring a predetermined specific additional property, for given operating conditions.

5. A composition according to claim 4, wherein said filler is selected from flame-retardant fillers and ceramizable fillers improving the resistance of the composition to fire and/or to fire propagation, and from fillers improving the ability to withstand tracking currents and ambient atmospheric conditions.

6. A cable including a covering layer and/or an insulating layer and/or a packing layer made of the composition according to claim 1.

7. A power accessory including a layer made of the composition according to claim 1.

* * * * *